United States Patent
Kitamura et al.

(10) Patent No.: US 7,668,389 B2
(45) Date of Patent: Feb. 23, 2010

(54) IMAGE PROCESSING METHOD, IMAGE PROCESSING APPARATUS, AND IMAGE PROCESSING PROGRAM

(75) Inventors: Yoshiro Kitamura, Kanagawa-ken (JP); Wataru Ito, Kanagawa-ken (JP)

(73) Assignee: FUJIFILM Corporation, Tokyo (JP)

(*) Notice: Subject to any disclaimer, the term of this patent is extended or adjusted under 35 U.S.C. 154(b) by 402 days.

(21) Appl. No.: 11/111,808

(22) Filed: Apr. 22, 2005

(65) Prior Publication Data

US 2005/0248655 A1    Nov. 10, 2005

(30) Foreign Application Priority Data

Apr. 23, 2004  (JP)  ............................. 2004-127877
Apr. 21, 2005  (JP)  ............................. 2005-124222

(51) Int. Cl.
*G03B 17/00*    (2006.01)

(52) U.S. Cl. ..................... 382/255; 348/187; 348/650

(58) Field of Classification Search ................. 382/255, 382/266, 298; 348/187, 650
See application file for complete search history.

(56) References Cited

U.S. PATENT DOCUMENTS

| 6,154,574 | A  | * | 11/2000 | Paik et al. | ............... | 382/255 |
| 6,289,133 | B1 |   | 9/2001  | Oshino      |                 |         |
| 7,356,254 | B2 | * | 4/2008  | Aoyama      | ............... | 396/147 |
| 2002/0181762 | A1 | * | 12/2002 | Silber     | ............... | 382/154 |
| 2002/0196472 | A1 | * | 12/2002 | Enomoto    | ............... | 358/3.26 |
| 2003/0002746 | A1 | * | 1/2003  | Kusaka     | ............... | 382/255 |
| 2003/0138163 | A1 | * | 7/2003  | Chen et al. | .............. | 382/274 |
| 2006/0078217 | A1 | * | 4/2006  | Poon et al. | .............. | 382/255 |

OTHER PUBLICATIONS

Mikio Takagi, Haruhisa Shimoda, Ed. "Handbook of Image Analysis", p. 549, Tokyo University Press, 1991.

* cited by examiner

*Primary Examiner*—Bhavesh M Mehta
*Assistant Examiner*—Stephen R Koziol
(74) *Attorney, Agent, or Firm*—Birch, Stewart, Kolasch & Birch, LLP

(57) ABSTRACT

High frequency components are efficiently extracted from blurred images, and blur correction is efficiently performed. A blur analyzing means judges whether an image is a blurred image. If the image is judged to be a blurred image, blur data Q, which includes a blur width, is generated and transmitted to a blur correcting means. The blur correcting means extracts high frequency components from the image if the blur width is less than a predetermined threshold value, and performs blur correction by adding the high frequency components to the image. Meanwhile, if the blur width is greater than or equal to the threshold value, a reducing means reduces the size of the image to obtain a reduced image. Then, the blur correcting means extracts high frequency components from the reduced image, and performs blur correction by emphasizing and adding the extracted high frequency components to the reduced image.

10 Claims, 12 Drawing Sheets

EDGE PROFILE

HISTOGRAM OF EDGE WIDTHS

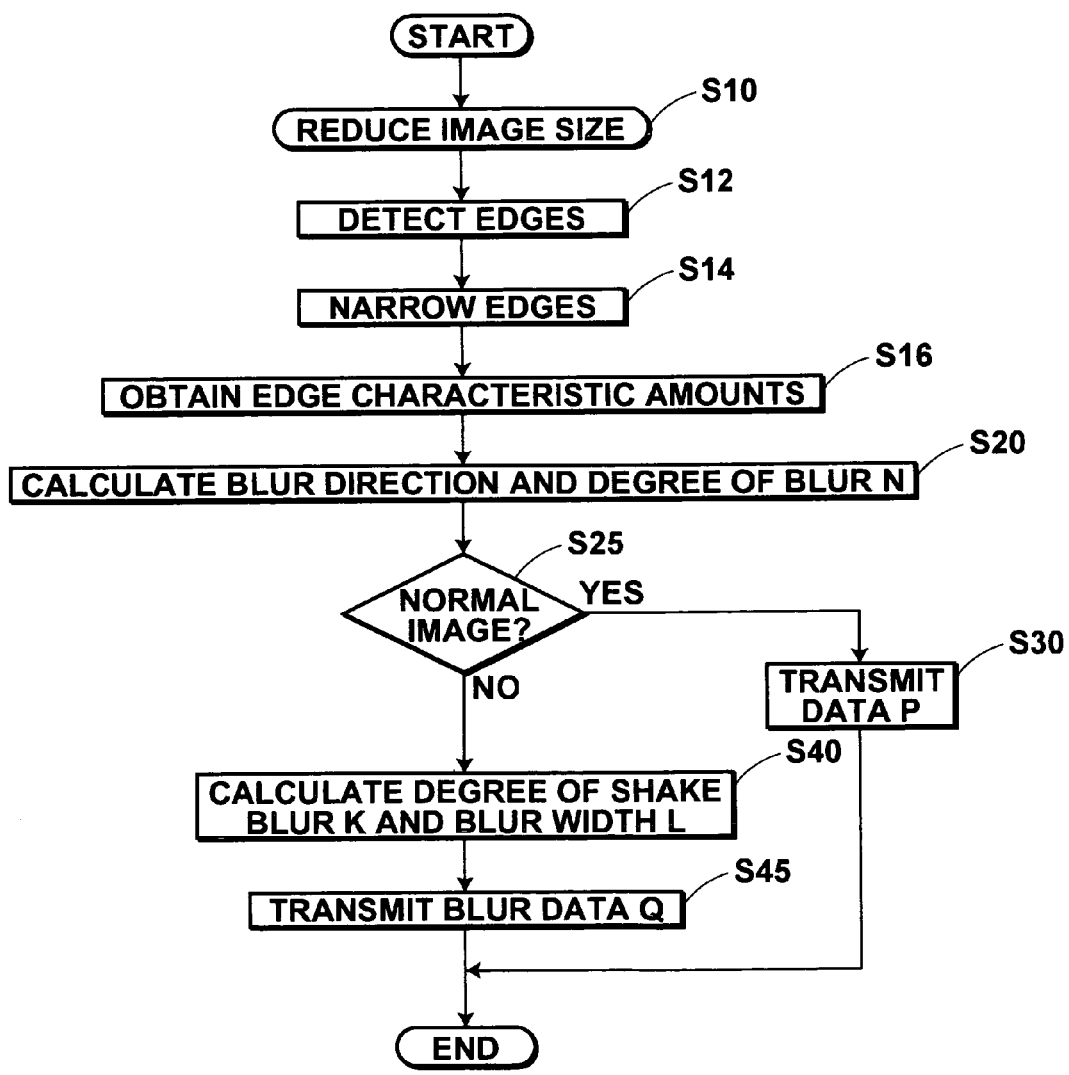

IMAGE PROCESSING METHOD, IMAGE PROCESSING APPARATUS, AND IMAGE PROCESSING PROGRAM

BACKGROUND OF THE INVENTION

1. Field of the Invention

The present invention relates to an image processing method, an image processing apparatus, and an image processing program, for extracting high frequency components from digital photographic images.

2. Description of the Related Art

In the field of image processing of digital photographic images, extraction of high frequency components is a process that is performed often. For example, various image processes are administered on digital image data sets to improve the image qualities thereof prior to printing. The digital image data sets are obtained by photoelectrically reading out photographic images, which are recorded on negative films or reversal films, with scanners, or by photography with digital still cameras (DSC's) . A blur correction process, for removing blur from blurred images, is an example of such an image process.

A blur correction method has been proposed, in which high -frequency components within images are extracted, emphasized, then added to the original images (in Mikio Takagi, Haruhisa Shimoda, Ed. "Handbook of Image Analysis", pp. 549, Tokyo University Press, for example). Specifically, this method is performed according to the following Formula (1).

$$S'=Sorg+\beta \cdot (Sorg-Sus) \qquad (1)$$

wherein

S': corrected image

Sorg: original image

Sus: blurred mask image

β: emphasizing coefficient

Here, Sus is an image obtained by applying a blurred mask on the original image Sorg, and represents the low frequency components of the original image Sorg. For this reason, (Sorg−Sus) represents the high frequency components of the original image Sorg. As can be understood from Formula (1) above, the corrected image S' is the sum of the original image Sorg, and the high frequency components of the original image Sorg, which have been emphasized with the coefficient β. Sufficient extraction of the high frequency components from the original image is a factor that affects the effectiveness of blur correction.

A commonly employed technique for extracting high frequency components from digital photographic images will be described. First, a blurred mask image is obtained by applying a blur mask, for example, a blur filter which is a low pass filter, on the original image. Then, the blurred mask image is subtracted from the original image, to extract the high frequency components. The time required for operations increases as the size of the blur filter increases. Therefore, filters having sizes of 5 taps to 7 taps are generally employed.

U.S. Pat. No. 6,289,133 discloses a method, by which high frequency components are extracted at high speed. In this method, original images are reduced in size to obtain reduced images. Then, a blur mask filter process is administered on the reduced images. Finally, the reduced images, on which the blur mask process has been administered, are enlarged to the size of the original images.

However, in cases that the degree of blur within original images is great, there are few high frequency components included therein. Therefore, if a blur filter of a conventional size is employed to extract high frequency components, the number of extractable high frequency components is low. For example, consider the case of a blurred image having the frequency characteristics illustrated in FIG. 12A. If high frequency components are extracted from this image employing a 5 tap filter having the frequency characteristics illustrated in FIG. 12B, the extracted high frequency components are those illustrated in FIG. 12C. As illustrated in FIG. 12C, the number of high frequency components extracted from a blurred image, such as that illustrated in FIG. 12A, is extremely low. For this reason, if the extracted high frequency components are employed to perform the aforementioned blur correction process, favorable correction results cannot be obtained.

Applying a blur filter of a large size may be considered, in order to sufficiently extract high frequency components from blurred images having great degrees of blur. However, the application of such filters will increase the time required for operations, and therefore would be inefficient.

Applying the method disclosed in U.S. Pat. No. 6,289,133, that is, reducing the size of the blurred image to obtain a reduced image, then extracting high frequency components from the reduced image, may also be considered. However, there is a possibility that high frequency components will be lost due to reduction, in the case of images that do not have great degrees of blur. As a result, high frequency components may not be sufficiently extracted, in a similar manner.

SUMMARY OF THE INVENTION

The present invention has been developed in view of the above circumstances. It is an object of the present invention to provide an image processing method, an image processing apparatus, and an image processing program that enable efficient extraction of high frequency components from blurred images.

The image processing method of the present invention is an image processing method for extracting high frequency components from digital photographic images, comprising the steps of:

obtaining the degree of blur within the digital photographic images;

obtaining reduced images, by reducing digital photographic images having a degree of blur greater than or equal to a predetermined threshold value; and extracting the high frequency components by employing the reduced images.

In the present invention, "digital photographic images" include digital images which have been obtained by reading out images from silver salt films, printed matter (photographic prints, for example) by use of readout apparatuses such as scanners, as well as digital images obtained by photographing subjects with digital cameras and the like. Hereinafter, the term "image" will also be used to refer to digital photographic images, for the sake of convenience in description.

The "degree of blur" refers to data that indicates the degree of blur within digital photographic images, and may be blur width, for example. Note that in the case that an image is not blurred, the degree of blur thereof may be set to zero. In addition, there are different types of blurred images. There is non-directional blur caused by out of focus photography, and there is directional blur caused by camera shake during photography. In the case of directional blur, the "degree of blur" corresponds to the degree of shake, and may be shake blur width, for example.

Reduction of the digital photographic images may be performed in both the vertical and horizontal directions of the images. Alternatively, reduction of the digital photographic images may be performed in only one of the directions.

The image processing method of the present invention may be applied to correct blur that occurs in digital photographic images. For example, high frequency components may be extracted from reduced images obtained by reducing the sizes of digital photographic images and employed to perform blur correction on the original digital photographic images (by emphasizing the high frequency components and adding them to the original digital photographic images, for example). Note that in this case, the high frequency components are extracted from the reduced images. Therefore, data interpolation is performed so as to enlarge the sizes of the high frequency components to match those of the original digital photographic images.

In the case that the image processing method of the present invention is applied to correct blur in digital photographic images, it is desirable for the blur correction to be administered on the reduced images, employing the extracted high frequency components.

The image processing apparatus of the present invention is an image processing apparatus for extracting high frequency components from digital photographic images, comprising:

blur degree obtaining means, for obtaining the degree of blur within the digital photographic images;

reducing means, for reducing digital photographic images having a degree of blur greater than or equal to a predetermined threshold value; and extracting means, for extracting the high frequency components by employing the reduced images.

The image processing apparatus of the present invention may be applied to correct blur that occurs in digital photographic images. For example, high frequency components may be extracted from reduced images obtained by reducing the sizes of digital photographic images and employed to perform blur correction on the original digital photographic images (by emphasizing the high frequency components and adding them to the original digital photographic images, for example).

In the case that the image processing apparatus of the present invention is applied to correct blur in digital photographic images, it is preferable for the blur correction to be administered on the reduced images, employing the extracted high frequency components.

The image processing method of the present invention may be provided as a program that causes a computer to execute the method.

Note that the program of the present invention may be provided being recorded on a computer readable medium. Those who are skilled in the art would know that computer readable media are not limited to any specific type of device, and include, but are not limited to: floppy disks, CD's, RAM's, ROM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to: source, object and executable code, and can be in any language, including higher level languages, assembly language, and machine language.

According to the image processing method, the image processing apparatus, and the image processing program of the present invention, when high frequency components are to be extracted from digital photographic images, first, the degree of blur within the photographic images is obtained. High frequency components are extracted from reduced images, obtained by reducing the sizes of the digital photographic images, if the degree of blur is greater than or equal to a predetermined threshold value. As described above, if the size of a blur filter is increased, in order to sufficiently extract high frequency components from digital photographic images having great degrees of blur, the time required for operations increases and the process becomes inefficient. On the other hand, if digital photographic images are reduced and high frequency components are extracted from the reduced images, in order to decrease the time required for operations, high frequency components may be lost from images having slight degrees of blur, due to the reduction process. The present invention has taken these points into consideration. In the present invention, high frequency components are extracted efficiently, by performing the extraction according to the degree of blur. That is, digital photographic images having great degrees of blur are reduced, then high frequency components are extracted from the reduced images. FIG. 13A is a graph that represents the frequency characteristics of the blurred image illustrated in FIG. 12A, reduced at a rate of 1/2 in one of the horizontal and the vertical directions. FIG. 13B is a graph that represents the high frequency components extracted from the image of FIG. 13A, employing the blur filter illustrated in FIG. 12B. As illustrated in FIG. 13B, high frequency components are substantially not lost, even if the blurred image of FIG. 12A is reduced, and a great number of high frequency components are extracted, even if the blur filter of FIG. 12B is employed.

In addition, according to the present invention, the degree of blur within digital photographic images is obtained when extracting high frequency components therefrom. Therefore, high frequency components may be extracted from digital photographic images having small degrees of blur, without reducing the images. Accordingly, it is possible to prevent the loss of high frequency components, due to reduction processes, from digital photographic images having small degrees of blur.

The high frequency components extracted by the image processing method and the image processing apparatus of the present invention may be applied to correct blur in digital photographic images. In this case, favorable correction results can be obtained, because the high frequency components are sufficiently extracted. At this time, the high frequency components extracted from the reduced images, specifically, images that represent the high frequency components, are smaller in size than the original digital photographic images. However, data interpolation may be performed so as to enlarge the sizes of the high frequency components to match those of the original digital photographic images.

Further, in recent years, the sizes of digital photographic images, that is, the numbers of pixels, continue to increase. When outputting digital photographic images as prints, for example, the images are reduced in the majority of cases. Meanwhile, in the method disclosed in U.S. Pat. No. 6,289, 133, a blur mask is applied to a reduced image, obtained by reducing the size of an original image. Then, the reduced image, to which the blur mask has been applied, is enlarged to the size of the original image, to extract the high frequency components and to perform blur correction on the original image. It is often the case that the corrected image needs to be reduced again to be output, which is inefficient. In the present invention, digital photographic images having great degrees of blur are reduced, to obtain reduced images. High frequency components may be extracted from the reduced images and blur correction performed thereon. In this case, if the size of images to be output is larger than the size of the reduced images, then the reduced images may be enlarged, and if the size of images to be output is the same as the size of the reduced images, then no enlargement or reduction is necessary, which is efficient. If the size of images to be output is smaller than the size of the reduced images, then it is necessary to further reduce the reduced images. However, even in this case, the reduction to the output image size is performed from the size of the reduced image, which is more efficient than reduction to the output image size from the size of the original image.

BRIEF DESCRIPTION OF THE DRAWINGS

FIG. 9 is a flow chart that illustrates the processes performed by the blur analyzing means of FIG. 2.

DESCRIPTION OF THE PREFERRED EMBODIMENTS

Hereinafter, an embodiment of the present invention will be described in detail with reference to the attached drawings.

Figure 1:
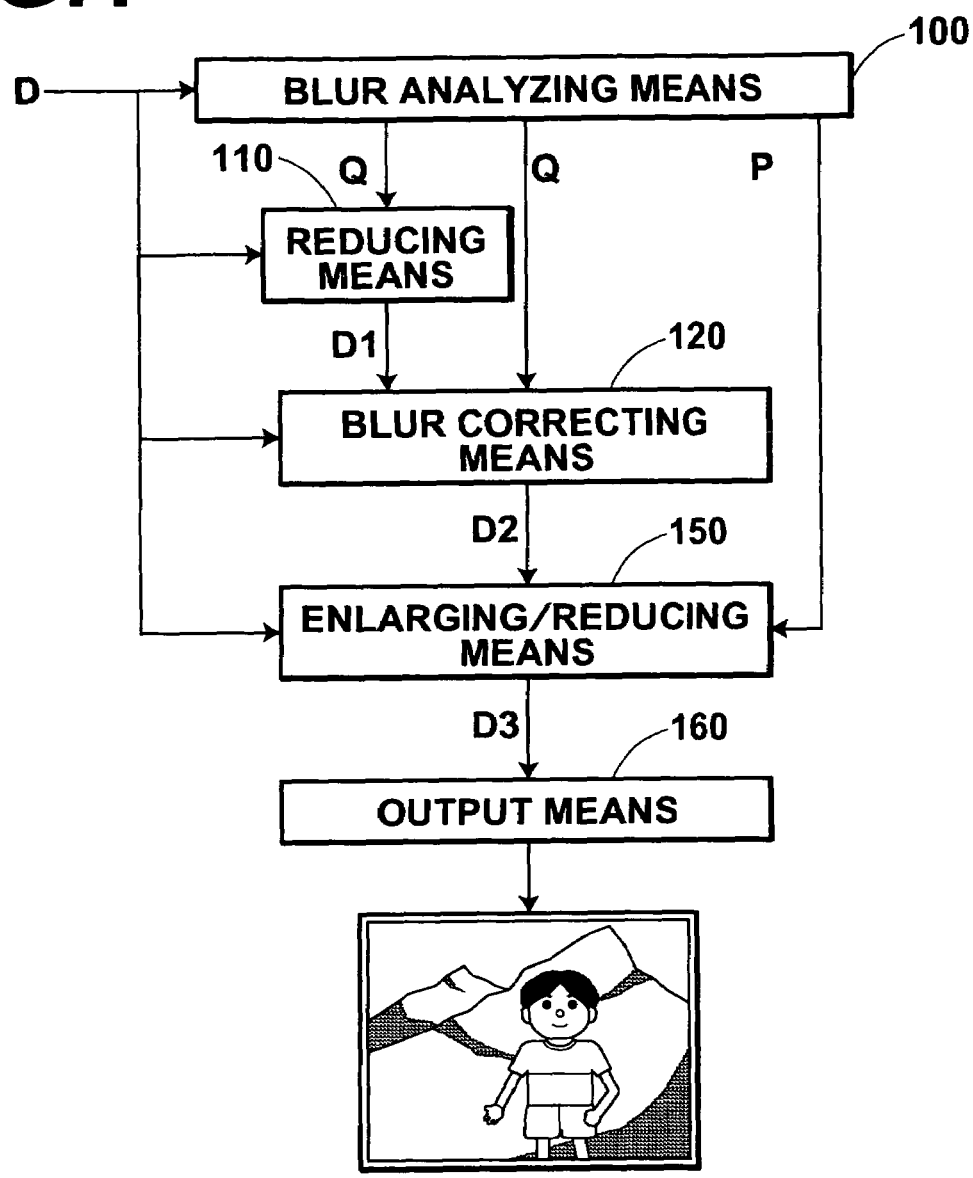
FIG. 1 is a block diagram illustrating the construction of an image processing apparatus according to an embodiment of the present invention.

FIG. 1 is a block diagram illustrating the construction of an image processing apparatus according to an embodiment of the present invention. Note that the image processing apparatus of the present embodiment performs blur correction on input digital photographic images (hereinafter, simply referred to as "images") and prints the corrected images. The blur correction process is realized by executing a blur correction program, read into an auxiliary memory device, on a computer such as a personal computer. The blur correction program may be installed in the computer, by being distributed recorded in data recording media such as CD-ROM's, or being distributed via a network such as the Internet.

Because image data sets represent images, image data sets and images are not distinguished in the following description.

As illustrated in FIG. 1, the image processing apparatus of the present embodiment comprises: blur analyzing means 100; reducing means 110; blur correcting means 120; enlarging/reducing means 150; and output means 160. The blur analyzing means 100 administers analysis of blur within images D, to judge whether the images D are blurred images or normal images. If an image D is judged to be a blurred image, the blur analyzing means 100 also obtains blur data Q, comprising a degree of blur N, a blur width L, and a shake blur width K (details of these components will be described later). The reducing means 110 reduces the size of blurred images D having blur widths L greater than or equal to a predetermined threshold value (designated as T1), to obtain reduced images D1. The blur correcting means 120 administers blur correction on the reduced images D1 obtained by the reducing means 110 (reduced images of blurred images having blur widths L greater than or equal to the threshold value T1) or on blurred images D (blurred images having blur widths L less than the threshold value T1), to obtain corrected images D2. The enlarging/reducing means 150 enlarges or reduces images D, which are not blurred images, or the corrected images D2, which have been obtained by the blur correcting means 120 by correcting blurred images D, so that their sizes match an output image size, to obtain output images D3. The output means 160 prints out the output images D3 obtained by the enlarging/reducing means 150, to obtain photographic prints.

The blur analyzing means 100 analyzes the images D. Reasons why images obtained by photographing subjects become blurred include focus blur caused by out of focus photography, and shake blur caused by a portion of the subject or the hand of the photographer moving during photography. In the case of focus blur, point images spread two dimensionally, that is, the spread within the photographic image is non-directional. In contrast, in the case of shake blur, point images spread along a one dimensional trajectory, that is, the spread within the photographic image is directional. The blur analyzing means 100 of the image processing apparatus according to the present embodiment takes these facts into consideration. The blur analyzing means 100 analyzes blur within the images D, based on the characteristics of edges within the images D.

Figure 2:
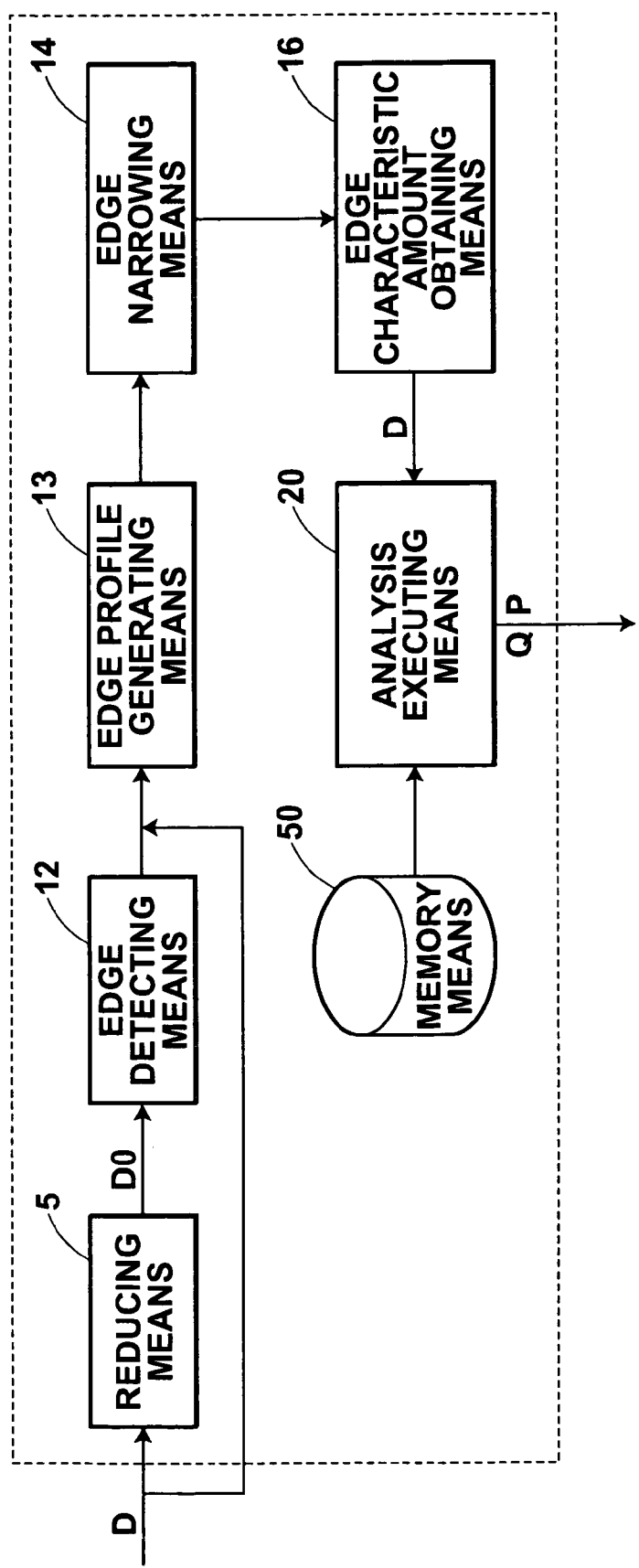
FIG. 2 is a block diagram illustrating the construction of a blur analyzing means of the image processing apparatus of FIG. 1.

FIG. 2 is a block diagram illustrating the construction of the blur analyzing means 100 of the image processing apparatus according to the present embodiment illustrated in FIG. 1. As illustrated in FIG. 2, the blur analyzing means 100 comprises: reducing means 5; edge detecting means 12; edge profile generating means 13; edge narrowing means 14; edge characteristic amount obtaining means 16; analysis executing means 20; and memory means 50. The reducing means administers reduction processes on the images D at a reduction rate of 1/8, for example, to obtain reduced images D0. The edge detecting means 12 employs the reduced images D0 to detect edges in each of the eight different directions illustrated in FIG. 3. The edge profile generating means 13 generates profiles of edges detected by the edge detecting means 12. The edge narrowing means 14 removes ineffective edges. The edge characteristic amount obtaining means 16 obtains characteristic amounts S regarding the edges that remain after removal of ineffective edges by the edge narrowing means 14. The analysis executing means 20 employs the edge characteristic amounts S to calculate the blur direction and the degree of blur N within the images D, to judge whether an image D is a blurred image or a normal image. In the case that the image D is a normal image, the analysis executing means 20 transmits data P, indicating that the image D is a normal image, to the enlarging/reducing means 150. In the case that the image D is a blurred image, the degree of shake blur K and the blur width L within the image D are calculated and transmitted, along with the degree of blur N and the blur direction, to the blur correcting means 120 as blur data Q. The memory means 50 has recorded in various databases for use by the analysis executing means 20. Note that in the case that the image D is a blurred image, the blur analyzing means 100 also transmits the blur data Q to the reducing means 110.

The edge detecting means 12 employs the reduced images D0, to detect edges of intensities greater than or equal to a predetermined intensity therein. The coordinate positions of these edges are obtained, then output to the edge profile generating means 13.

Figure 3:
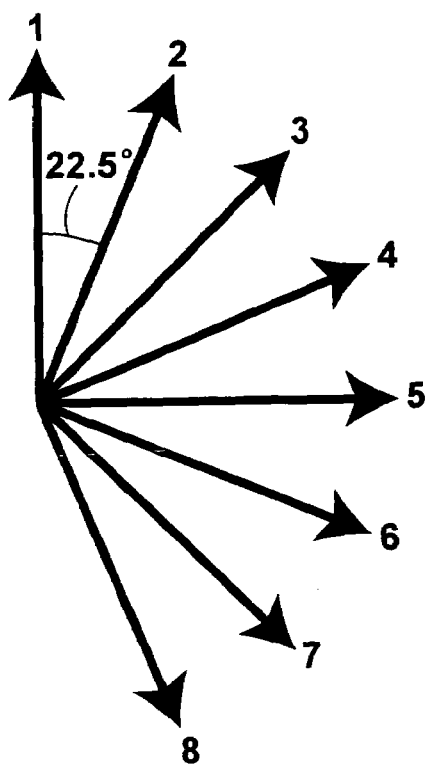
FIG. 3 is a diagram illustrating the directions which are employed during edge detection.

The edge profile generating means 13 generates edge profiles for each of the edges, which have been detected by the edge detecting means 12 in the eight directions illustrated in FIG. 3. The edge profiles are generated employing the images D, based on the coordinate positions of the detected edges, then output to the edge narrowing means 14.

The edge narrowing means 14 removes ineffective edges, based on the edge profiles output thereto from the edge profile generating means 13. Ineffective edges are those that have complex profile shapes, those that include a light source (edges having brightness greater than or equal to a predetermined brightness), and the like. The remaining edge profiles are output to the edge characteristic amount obtaining means 16.

Figure 4:
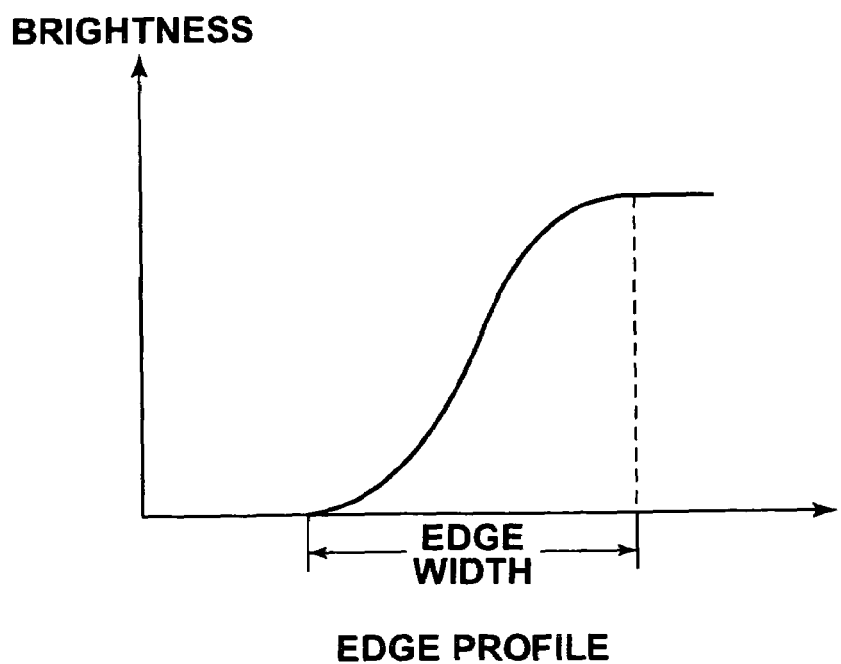
FIG. 4 is a diagram illustrating an edge profile.
Figure 5:
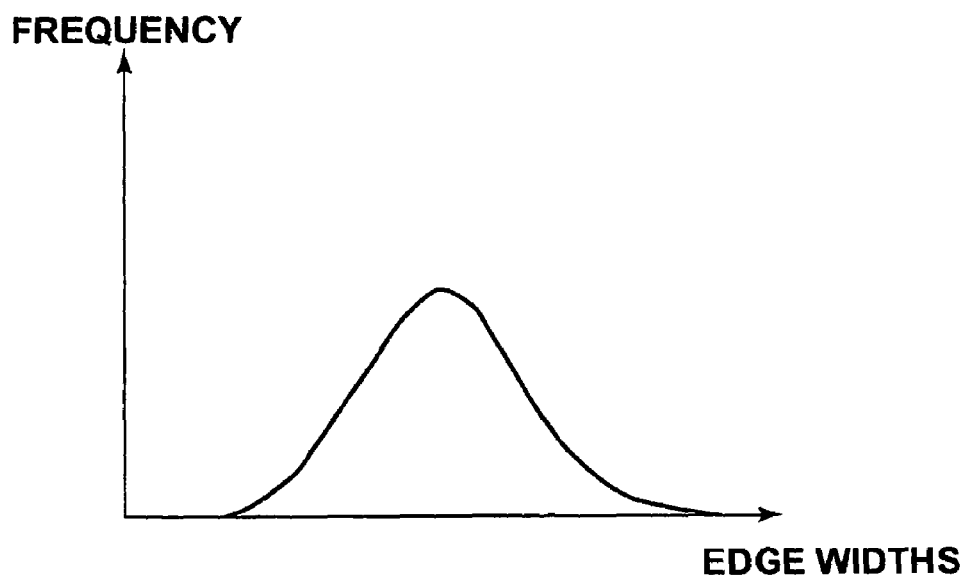
FIG. 5 is a histogram of edge widths.

The edge characteristic amount obtaining means 16 derives edge widths, such as that illustrated in FIG. 4, based on the edge profiles output thereto from the edge narrowing means 14. Then, histograms of the edge widths, such as that illustrated in FIG. 5, are generated for each of the eight directions illustrated in FIG. 3. The histograms are output, along with the edge widths, to the analysis executing means 20, as edge characteristic amounts S.

The analysis executing means 20 mainly performs the following two processes.
1. Deriving the blur direction and the degree of blur N within images D, to judge whether an image D is a blurred image or a normal image.
2. Calculating blur widths L and shake blur widths K, in the case that the image D is judged to be a blurred image.

The processes will be described, starting with the first process.

Figure 6A:
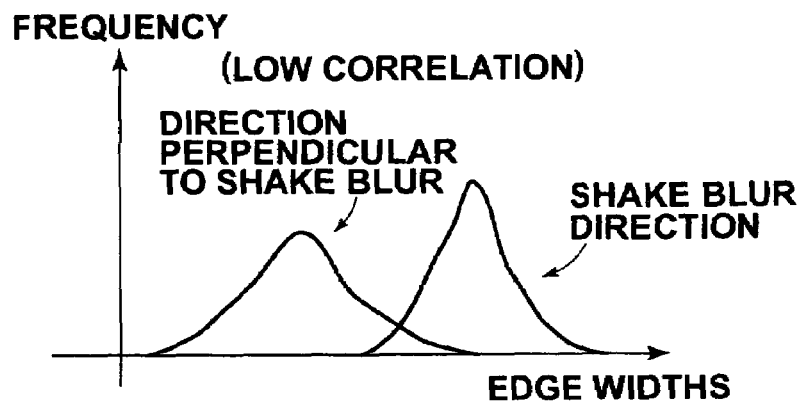
FIGS. 6A, 6B, and 6C illustrate histograms for explaining the operation of an analysis executing means.
Figure 6B:
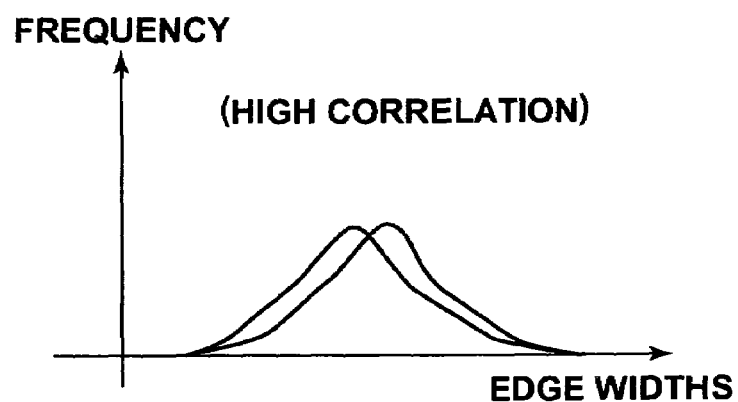

The analysis executing means 20 derives the blur direction within an image D. First, the histograms of the edge widths in the eight directions illustrated in FIG. 3 (hereinafter, simply referred to as "histograms") are grouped into directional sets, such that directions which are perpendicular to each other are grouped together. Then, the correlative values of the histograms of each directional set (1-5, 2-6, 3-7, and 4-8) are obtained. Note that there are various types of correlative values, depending on the obtainment method. The types can be broadly grouped into those in which correlation is low if the correlative value is high, and those in which correlation is high if the correlative value is high. In the present embodiment, correlative values of the type in which correlation is high if the correlative value is high are employed, as an example. As illustrated in FIG. 6A, in the case that shake blur is present within an image, the correlation between a histogram in the shake blur direction and a histogram in a direction perpendicular to the shake blur direction is low. On the other hand, directional sets of histograms unrelated to the shake blur direction, or directional sets of histograms obtained regarding an image in which there is no shake blur (an image without shake blur, or an image having focus blur) have high correlations, as illustrated in FIG. 6B. The analysis executing means 20 of the image processing apparatus according to the present embodiment takes these trends into consideration. The analysis executing means 20 obtains correlative values for the four directional sets of histograms, and determines the two directions of the histograms within the directional set having the lowest correlation. If shake blur is present in the image D, one of the two directions can be considered to be the direction closest to the shake blur direction from among the eight directions illustrated in FIG. 3.

Figure 6C:
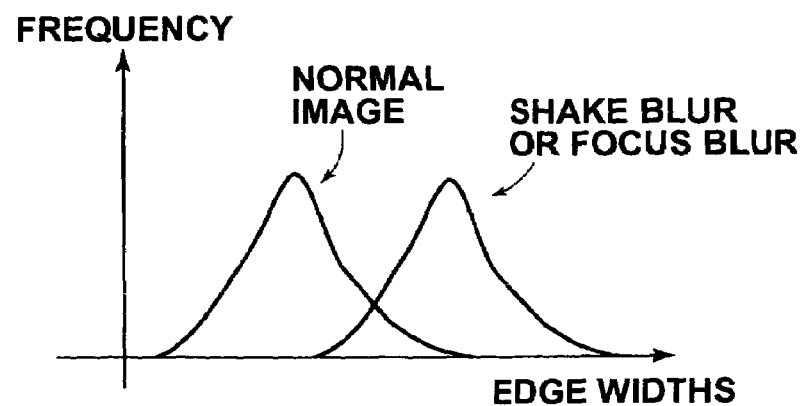

FIG. 6C illustrate histograms obtained from images of the same subject, photographed under different photography conditions. One of the images has been photographed with either focus blur or shake blur, and the other image is a normal image, which has been photographed without any blur. As can be seen from FIG. 6C, the normal image without blur has the smallest average edge width. That is, of the aforementioned two directions, the direction having the larger average edge width should be the direction closest to the shake blur direction.

Figure 7:
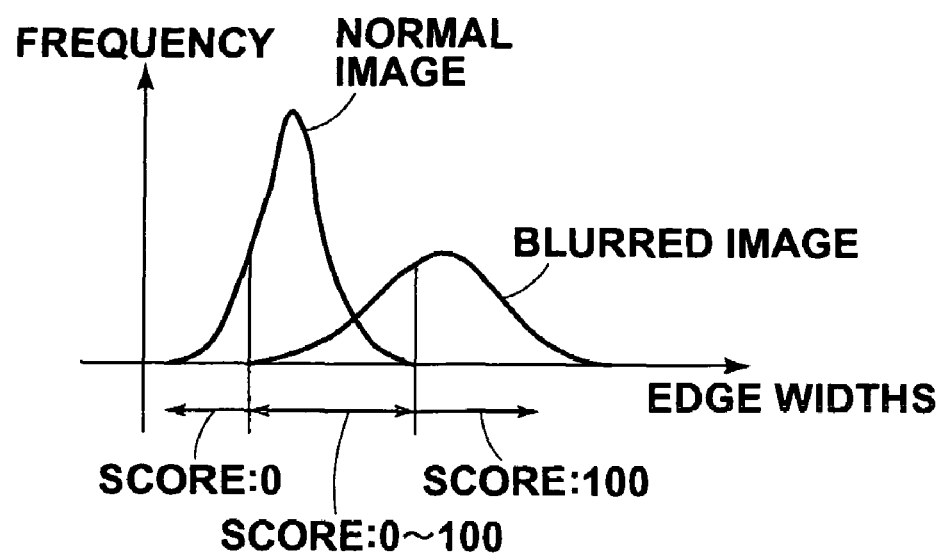
FIG. 7 illustrates a histogram for explaining calculation of a degree of blur.

Next, the analysis executing means 20 obtains the degree of blur N within the images D. The degree of blur N represents the probability that an image is a blurred image. For example, the average edge width in the most blurred direction within an image (the aforementioned shake blur direction) may be employed as the degree of blur N. However, here, the edge widths of each of the edges in the blur direction are employed to refer to a database, based on FIG. 7, to obtain more accurate results. FIG. 7 illustrates histograms of edge width distributions of edges in the most blurred direction within normal images and blurred (focus blur or shake blur) images. The histogram utilizes normal images and the blurred images, which are recorded in databases of sample images for learning. Ratios of frequencies of edge widths in the blurred images and frequencies of edge widths in the normal images are obtained and designated as evaluation values ("SCORES" in FIG. 7). A database (hereinafter, referred to as "score database"), in which edge widths and scores are correlated, is generated based on FIG. 7. The score database is recorded in the memory means 50. Note that although it is desirable for the "most blurred direction" within the normal images to be directions corresponding to the most blurred direction in the blurred images, any desired direction may be used.

The analysis executing means 20 refers to the score database, generated based on FIG. 7 and recorded in the memory means 50, to obtain scores corresponding to the edge widths of each edge in the blur direction within the images D. The scores of all of the edges in the blur direction are averaged, to obtain the degree of blur N within an image D. If the degree of blur N of an image D is less than a predetermined threshold (designated as T2), the analysis executing means 20 judges the image D to be a normal image. Data P, indicating that the image D is a normal image, is output to the enlarging/reducing means 150, and the process ends.

On the other hand, if the degree of blur N within an image D is greater than or equal to the threshold value T2, the analysis executing means 20 judges that the image D is a blurred image, and initiates the aforementioned second process.

In the second process, the analysis executing means 20 first obtains the degree of shake blur K within images D.

The degree of shake blur K, which represents the degree of shake within blurred images, can be obtained based on the following factors.
1. The degree of shake blur is greater in cases that the correlation of the directional set having the smallest correlation (hereinafter, referred to as "minimum correlation set") is lower.

Figure 8A:
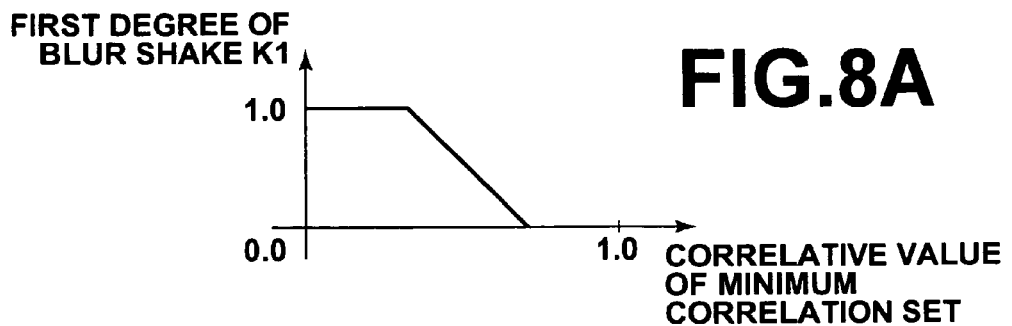
FIGS. 8A, 8B, and 8C illustrate graphs for explaining calculation of a degree of shake blur.

The analysis executing means 20 takes this point into consideration, and obtains a first degree of shake blur K1, based on the curve illustrated in FIG. 8A. Note that a look up table (LUT), which has been generated according to the curve of FIG. 8A, is recorded in the memory means 50. The analysis executing means 20 obtains the first degree of shake blur K1, by reading out the first degree of shake blur K1, that corresponds to the correlative value of the minimum correlation set, from the memory means 50.

2. The degree of shake blur is greater in cases that the average edge width of the direction, having the greater average edge width of the two directions of the minimum correlation set, is greater.

Figure 8B:
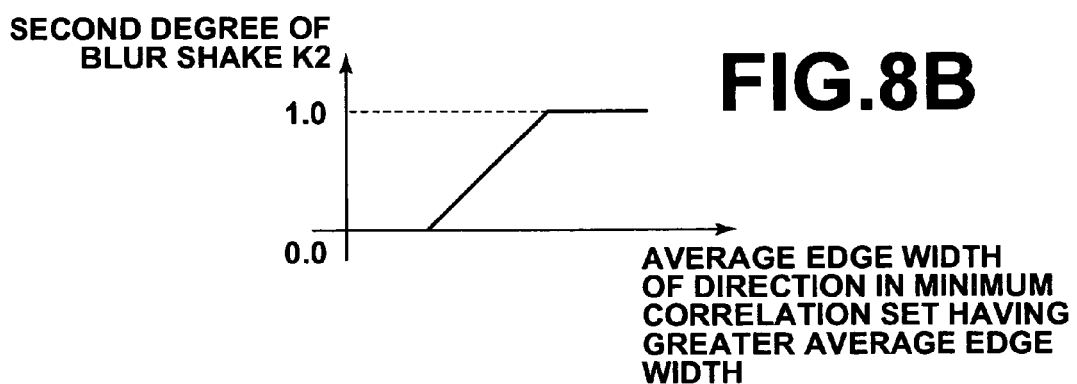

The analysis executing means 20 takes this point into consideration, and obtains a second degree of shake blur K2, based on the curve illustrated in FIG. 8B. Note that a look up table (LUT), which has been generated according to the curve of FIG. 8B, is recorded in the memory means 50. The analysis executing means 20 obtains the second degree of shake blur K2, by reading out the second degree of shake blur K2, that corresponds to the average edge width of the direction having the greater average edge width of the two directions in the minimum correlation set, from the memory means 50.

3. The degree of shake blur is greater in cases that the difference in average edge widths of the two directions of the minimum correlation set is greater.

Figure 8C:
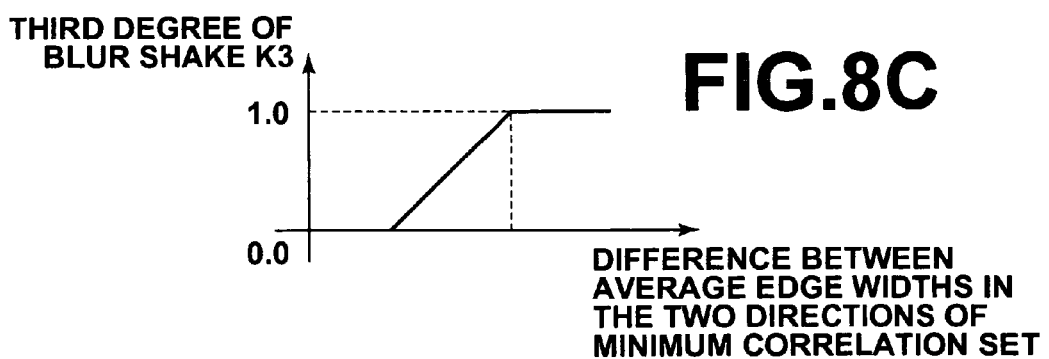

The analysis executing means 20 takes this point into consideration, and obtains a third degree of shake blur K3, based on the curve illustrated in FIG. 8C. Note that a look up table (LUT), which has been generated according to the curve of FIG. 8C, is recorded in the memory means 50. The analysis executing means 20 obtains the third degree of shake blur K3, by reading out the third degree of shake blur K3, that corresponds to the difference in average edge width of the two directions in the minimum correlation set, from the memory means 50.

The analysis executing means 20 obtains the first degree of shake blur K1, the second degree of shake blur K2, and the third degree of shake blur K3 in this manner. The degree of shake blur K within an image D is calculated, employing K1, K2, and K3, according to the following Formula (2).

$$K = K1 \times K2 \times K3 \quad (2)$$

wherein
K: degree of shake blur
K1: first degree of shake blur
K2: second degree of shake blur
K3: third degree of shake blur Next, the analysis executing means 20 obtains the blur width L of an image D, which is a blurred image. Here, the average edge width of all of the edges in all eight of the directions illustrated in FIG. 3 may be employed as the blur width L. However, in the present embodiment, the average edge width of edges in the blur direction is employed as the blur width L. Note that in the case that the blur direction is found to be "non-directional", an average edge width of edges in any one direction, or an average edge width of edges in any desired number of directions, may be employed as the blur width L.

The analysis executing means 20 obtains the degree of shake blur K and the blur width L of images D, which are blurred images. The degree of shake blur K and the blur width L are transmitted along with the degree of blur N and the blur direction to the reducing means 110 and the blur correcting means 120, as blur data Q.

FIG. 9 is a flow chart tat illustrates the processes performed by the blur analyzing means 100 illustrated in FIG. 2. As illustrated in FIG. 9, first, an image D is reduced by the reducing means 5, and becomes a reduced image D0 (step S10). The edge detecting means 12 detects edges, of intensities greater than or equal to a predetermined intensity, in the eight directions illustrated in FIG. 3 within the reduced image D0 (step S12). The edge detecting means 12 obtains the coordinate positions of each of the detected edges. Then, the edge profile generating means 13 generates edge profiles for each of the detected edges based on the coordinate positions, employing the image D. The edge profiles are output to the edge narrowing means 14. The edge narrowing means 14 removes ineffective edges, based on the edge profiles output thereto from the edge profile generating means 13, and outputs the remaining edges to the edge characteristic amount obtaining means 16 (step S16). The edge characteristic amount obtaining means 16 obtains the width of each of the edges, based on the edge profiles output thereto from the edge profile generating means 13, generates histograms of the edge widths in each of the directions illustrated in FIG. 3, and outputs the edge widths and the histograms of edge widths in each direction to the analysis executing means 20, as edge characteristic amounts S (step S16). The analysis executing means 20 employs the edge characteristic amounts S to calculate the blur direction and the degree of blur N within the image D, and judges whether the image D is a blurred image or a normal image (step S20, step S25). In the case that the image D is a normal image (step S25: YES), the analysis executing means 20 outputs data P, indicating that the image D is a normal image, to the enlarging/reducing means 150 (step S30). On the other hand, in the case that the image D is judged to be a blurred image (step S25: NO), the analysis executing means 20 further obtains the degree of shake blur K and the blur width L within the image D, and outputs the degree of shake blur K and the blur width L, along with the degree of blur N and the blur direction obtained in step S20, to the reducing means 110 and the blur correcting means 120, as blur data Q (step S40, step S45).

When the reducing means 110 of the image processing apparatus according to the present embodiment, illustrated in FIG. 1, receives the blur data Q from the blur analyzing means 100 (that is, if the image D has been judged to be a blurred image by the blur analyzing means 100), the reducing means 110 refers to the blur width L included in the blur data Q. In the case that the blur width L is less than the aforementioned threshold T1, the image D is not reduced in size. However, if the blur width L is greater than or equal to the threshold value T1, the image D is reduced in size to obtain a reduced image D1, which is then output to the blur correcting means 120. In the present embodiment, it is assumed that the size of the image D is larger than the size of an output image for printing. Therefore, the reducing means 110 reduces images D having blur widths L less than the threshold value T1 to the size of the output images for printing.

Figure 10:
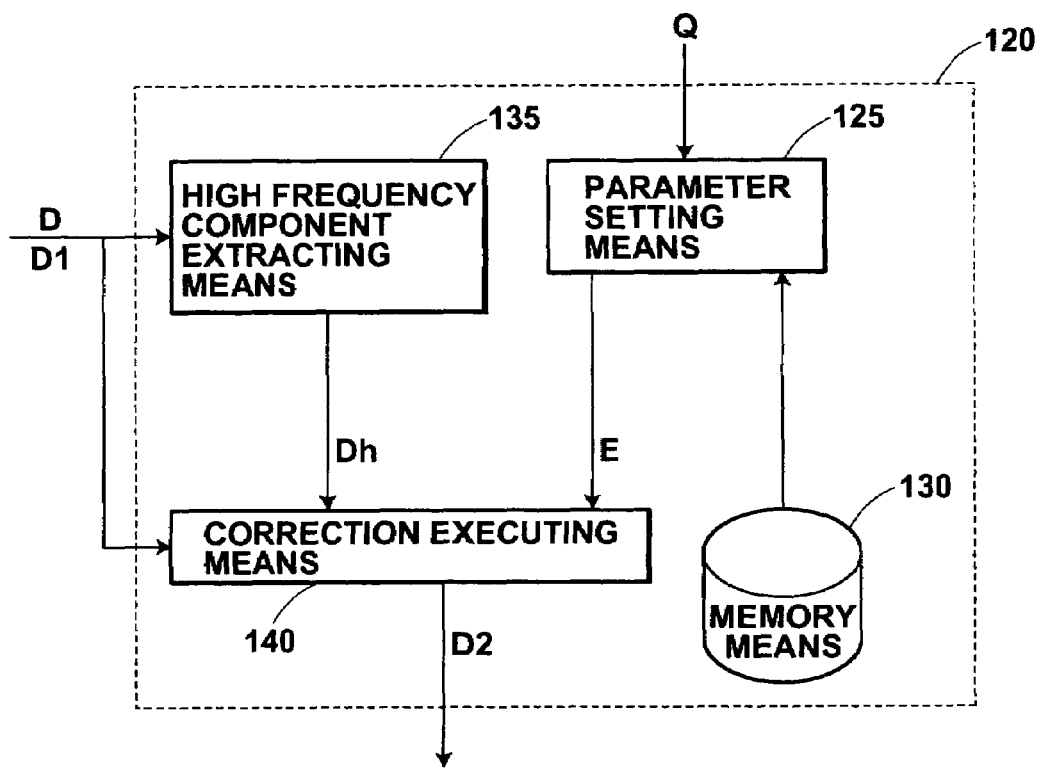
FIG. 10 is a block diagram illustrating the construction of a blur correcting means of the image processing apparatus of FIG. 1.

FIG. 10 is a block diagram illustrating the construction of the blur correcting means 120 of the image processing apparatus illustrated in FIG. 1. The blur correcting means 120 administers blur correction on images D, which have been judged to be blurred images by the blur analyzing means 100 and have blur widths L less than the threshold value T1, and on reduced images D1, which are blurred images having blur widths L greater than or equal to the threshold value T1 and which have been reduced by the reducing means 110. As illustrated in FIG. 10, the blur correcting means comprises: parameter setting means 125; memory means 130; high frequency component extracting means 135; and correction executing means 140. The parameter setting means 125 sets parameters E for blur correction, based on the blur data Q. The memory means 130 has recorded therein various databases for use by the parameter setting means 125. The high frequency component extracting means 135 extracts high frequency components Dh from the images D or from the reduced images D1. The correction executing means 140 administers blur correction on the images D or the reduced images D1, employing the correction parameters E set by the parameter setting means 135.

The parameter setting means 125 sets a one dimensional correction parameter W1 for directional correction and a two dimensional correction parameter W2 for isotropic correction according to Formula (3) below.

$$W1 = N \times K \times M1$$
$$W2 = N \times (1-K) \times M2 \qquad (3)$$

wherein
W1: one dimensional correction parameter
W2: two dimensional correction parameter
K: degree of shake blur
M1: one dimensional correction mask
M2: two dimensional correction mask
N: degree of blur That is, the parameter setting means 125 sets the correction parameters W1 and W2 (collectively referred to as parameters E) such that the isotropic correction and the directional correction are weighted more as the degree of blur N is greater, and such that the directional correction are weighted more (while the isotropic correction is weighted less) as the degree of shake blur K is greater. The parameter setting means 125 outputs the correction parameters E, set in this manner, to the correction executing means 140.

The high frequency component extracting means 135 extracts the high frequency components Dh from the images D or the reduced images D1, employing blur filters of the same size, for example, 5 taps. The extracted high frequency components Dh are output to the correction executing means 140.

The correction executing means 140 employs the correction parameters E set by the parameter setting means 125, to emphasize the high frequency components extracted from the blurred images D, to obtain corrected images D2. The correction executing means 140 also employs the correction parameters E set by the parameter setting means 125, to emphasize the high frequency components extracted from the reduced images D1, to obtain corrected images D2, which are then output to the enlarging/reducing means 150. Specifically, blur correction is performed by emphasizing the high frequency components employing the correction parameters E, set by the parameter setting means 125, according to Formula (4) below.

$$D2 = Dorg + E \times Dh \qquad (4)$$

wherein
D2: corrected image
Dorg: image prior to correction (either an image D or a reduced image D1)
Dh: high frequency components of the image prior to correction
E: correction parameters In this manner, corrected images D2 of the same size as the images D, which are blurred images, are obtained by the blur correcting means 120 if the blur widths L of the images D are less than the threshold value T1. Meanwhile, if the blur widths L of the images D are greater than or equal to the threshold value T1, then corrected images D2, of the same size as the reduced images D1, which is the same size as that of output images for printing, are obtained.

The enlarging/reducing means 150 enlarges or reduces images D, which are not blurred images, or corrected images D2, obtained by the blur correcting means 120, so that the sizes thereof match that of output images for printing, to obtain output images D3. Note that in the present embodiment, the reducing means 110 reduces images D to the same size as that of the output images. Therefore, enlargement/reduction is not performed on corrected images D2 obtained from the reduced images D1. However, enlargement/reduction is performed on normal images D and corrected images D2 obtained from blurred images D.

The output means 160 prints out the output images D3, to obtain photographic prints.

Figure 11:
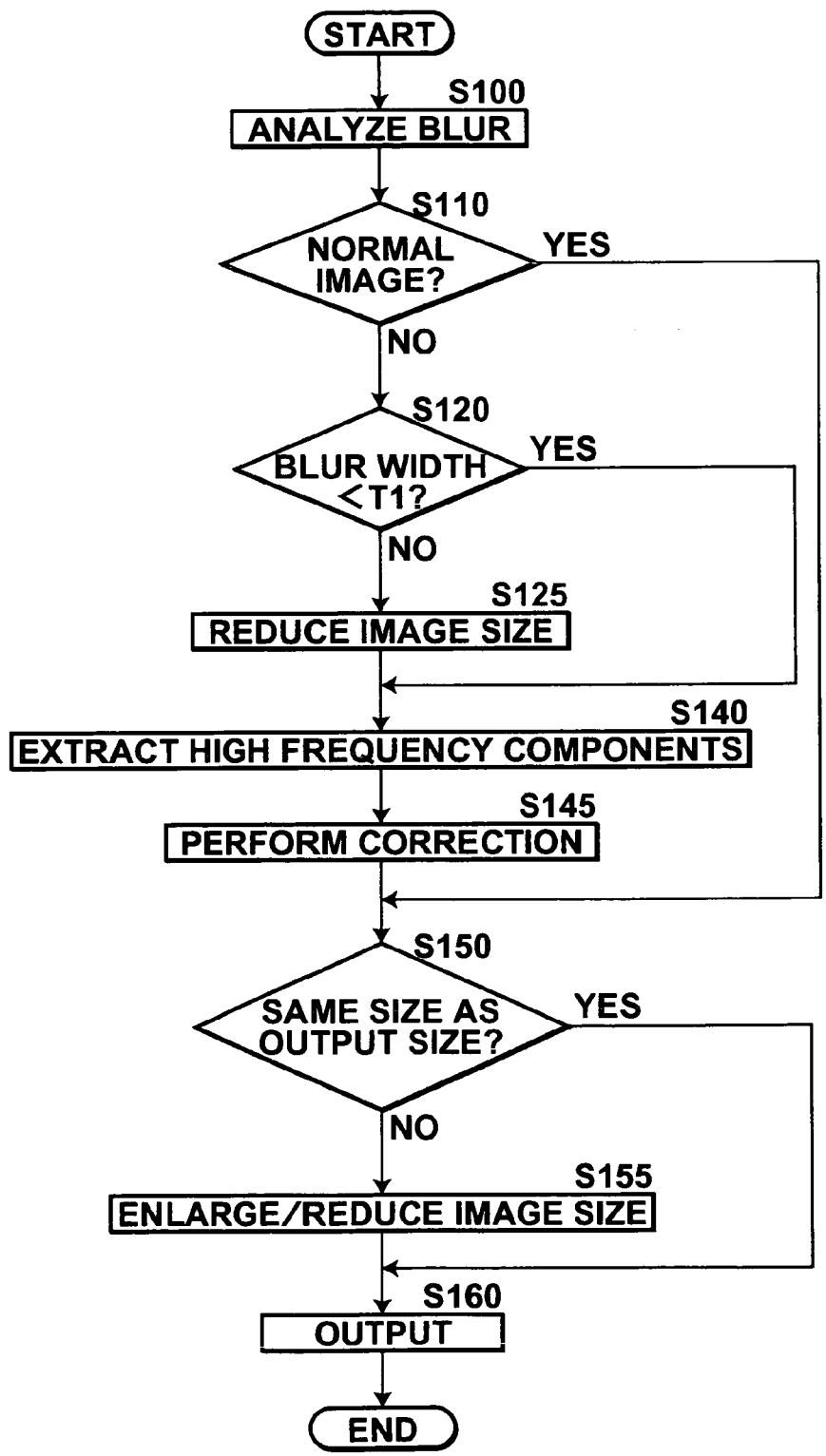
FIG. 11 is a flow chart that illustrates the processes performed by the blur correcting means of FIG. 10.
Figure 12A:
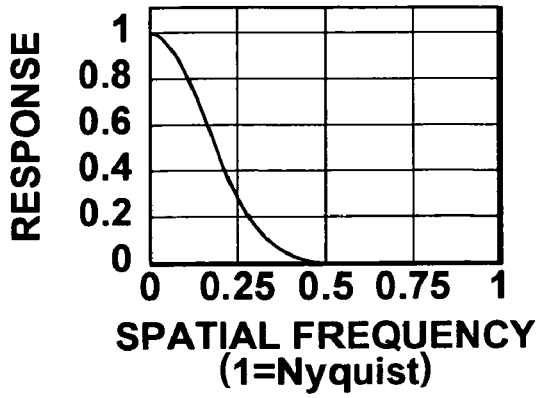
FIGS. 12A, 12B and 12C are diagrams for explaining extraction of high frequency components from a blurred image.
Figure 12B:
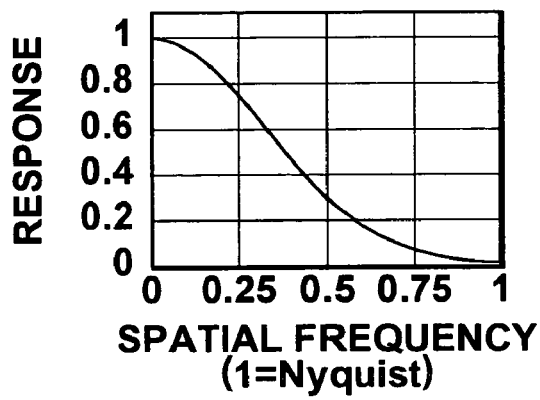
Figure 12C:
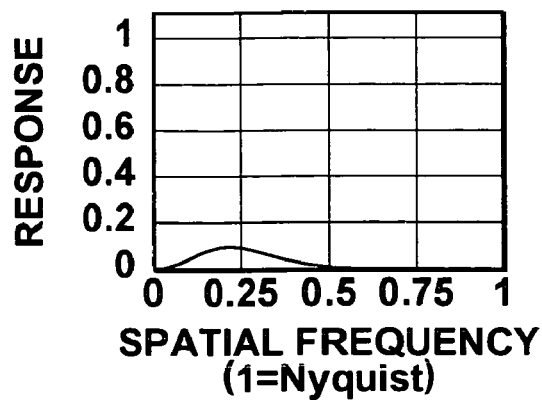
Figure 13A:
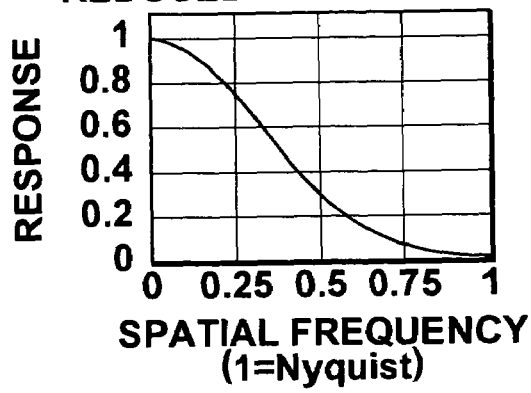
FIGS. 13A and 13B are diagrams for explaining extraction of high frequency components from a reduced image obtained from the blurred image of FIG. 12.
Figure 13B:
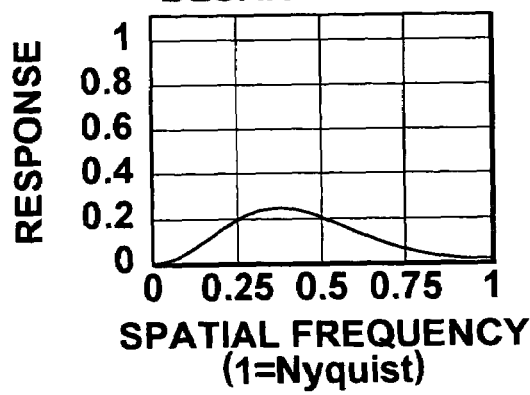

FIG. 11 is a flow chart that illustrates the processes performed by the image processing apparatus according to the present embodiment, illustrated in FIG. 1. As illustrated in FIG. 11, first, the blur analyzing means 100 administers blur analysis on an image D, to judge whether the image D is a blurred image or a normal image, and in the case that the image D is judged to be a blurred image, the degree of blur N, the blur width L, and the degree of shake blur K within the image D are obtained and output as blur data Q (step S100). In the case that the image D is judged to be a normal image, the blur analyzing means 100 transmits data P, indicating that the image D is not a blurred image, to the enlarging/reducing means 150 (step S110: YES). On the other hand, in the case that the image D is judged to be a blurred image (step S110: NO), the blur analyzing means 100 transmits the blur data Q of the image D to the reducing means 110 and the blur correcting means 120. The reducing means 110 refers to the blur width L included in the blur data Q, and if the blur width L is less than the threshold value T1, the image D is not reduced, and the process proceeds to blur correction of the image D by the blur correcting means 120 (S120: YES, step S140, step S145). However, if the blur width L is greater than or equal to the threshold value T1, the image D is reduced to obtain a reduced image D1, which is output to the blur correcting means 120, and the process proceeds to blur correction of the reduced image D1 by the blur correcting means 120 (S120: NO, step S140, step S145). Steps S140 and S145 are processes performed by the blur correcting means 120. Specifically, the blur correcting means 120 extracts high frequency components Dh from blurred images D, which have blur widths L less than the threshold value T1, emphasizes the high frequency components Dh, then adds them to the images D, to obtain corrected images D2 of the same size as the images D. However, if the blur widths L of the blurred images D are greater than or equal to the threshold value T1, the blur correcting means 120 extracts high frequency components Dh from the reduced images D1, emphasizes the high frequency components Dh, then adds them to the reduced images D1, to obtain corrected images D2 of the same size as the reduced images D1.

The enlarging/reducing means 150 reduces normal images D and corrected images D2, which have been obtained by the blur correcting means 120 and are of the same size as the blurred images D, to obtain output images D3 (S150: NO, step S155), which are transmitted to the output means 160. Corrected images D2, which have been obtained by the blur correcting means 120 from the reduced images D1, are transmitted to the output means 160 as they are, as output images D3 (S150: YES).

The output means 160 prints out the output images D2 to obtain photographic prints (step S160).

A preferred embodiment of the present invention has been described above. However, the image processing method, the image processing apparatus, and the image processing program of the present invention are not limited to the above embodiment. Various changes and modifications may be made, as long as they do not depart from the spirit of the invention.

For example, the image processing apparatus of the above embodiment performs blur correction on reduced images, employing high frequency components extracted therefrom, in order to make the process more efficient. Alternatively, interpolation processing may be administered on the high frequency components, extracted from the reduced images, to enlarge the high frequency components to a size that matches the size of an original image. Then, blur correction may be performed on the original image, employing the enlarged high frequency components. Thereafter, a corrected image may undergo processes, such as a reduction process, according to the size of images to be output.

In the above embodiment, images are not reduced if the blur width thereof is smaller than the threshold value, and only reduced if the blur width thereof is greater than or equal to the threshold value. Alternatively, reduction rates may be varied according to the degree of blur. That is, a configuration may be adopted wherein the reduction rate is increased as the degree of blur increases. Here, the reduction rate is defined such that images are reduced to smaller sizes as the reduction rate increases.

In the image processing apparatus of the above embodiment, the direction, having the greater average edge width of the two directions in the minimum correlation set, is designated as the blur direction. Alternatively, degrees of blur may be calculated for both the minimum correlation set (the directional set having the lowest correlation) and a directional set having the second lowest correlation. Then, blur direction candidates may be obtained from both directional sets, by designating the direction having the greater average edge width of the two directions in each directional set as the blur direction candidate. Then, the blur direction candidates may be weighted according to the degrees of blur of the directional sets, to obtain the blur direction. That is, the blur direction candidate obtained from the directional set having a greater degree of blur is weighted more heavily. In this case, a blur width may be obtained in the same manner. That is, the average edge widths in the two blur direction candidates may be weighted more heavily for the directional set having the greater degree of blur, to obtain the blur width.

In addition, in the image processing apparatus of the above embodiment, no distinction is made regarding whether the blur in a blurred image D is focus blur or shake blur. If an image is judged to be a blurred image, the degree of shake is obtained. Then, an isotropic correction parameter and a directional correction parameter are calculated, based on equations that include weighting coefficients corresponding to the degree of shake blur (in the image processing apparatus of the present embodiment, the degree of shake blur itself is employed as the weighting coefficient). Then, the blurred image is corrected employing the obtained correction parameters. Alternatively, for example, blur, within blurred images having a degree of shake blur less than a predetermined threshold value, may be judged to be focus blur. Blurred images, in which the blur is focus blur, may be corrected by setting and employing only an isotropic correction parameter.

Further, in the image processing apparatus of the above embodiment, the blur correcting means 120 extracts high frequency components within a single high frequency band from blurred images D (having small blur widths L) or from reduced blurred images D1. Then, the extracted high frequency components are emphasized, to perform blur correction. Alternatively, components may be extracted from a plurality of different frequency bands, ranging from the highest frequency band to an intermediate frequency band. The components extracted from the different frequency bands may each be emphasized and added to the original image, to perform blur correction.

In the above embodiment, the degree of blur is obtained by analysis by the blur analyzing means 100 and the like. Alternatively, values which are correlated with degrees of blur may be obtained by other means, and utilized as the degree of blur. A gyroscope for detecting camera shake may be mounted on a camera, and the amount of camera shake, detected by the gyroscope, may be input as the degree of blur, for example.

The blur correction described in the present invention may be applied to any digital photographic image. The present invention may be applied to cellular phone cameras, digital cameras, and printers that print out digital image data sets.

What is claimed is:

1. An image processing method, for extracting high frequency components from digital photographic images, comprising the steps of:
   obtaining a blur width of a blur within a digital photographic image;
   obtaining a reduced image, by reducing the resolution of the digital photographic image to a reduced digital photographic image when the blur width is greater than or equal to a predetermined threshold value;
   maintaining a size of the digital photographic image by not reducing the digital photographic image if the blur width is less than a predetermined threshold value;
   extracting the high frequency components by employing the reduced digital photographic image or the non-reduced digital photographic image; and
   outputting a corrected digital photographic image based on the extracted high frequency components.

2. An image processing method as defined in claim 1, wherein:
   blur correction is administered on the digital photographic image, employing the extracted high frequency components.

3. An image processing method as defined in claim 1, wherein:
   blur correction is administered on the reduced image, employing the extracted high frequency components.

4. An image processing method as defined in claim 1, wherein:
   reduction of the digital photographic image is performed such that greater reduction rates are employed as the degree of blur increases.

5. An image processing apparatus, for extracting high frequency components from digital photographic images, comprising:
   blur degree obtaining means, for obtaining a blur width of a blur within a digital photographic image;
   reducing means, for
      receiving digital photographic image data from the blur degree obtaining means;
      determining whether the blur width of the received digital photographic image data is equal to or greater than a predetermined threshold,
      reducing the resolution of the digital photographic image to a reduced digital photographic image when the degree of blur is greater than or equal to a predetermined threshold value and outputting the reduced digital photographic image; and
      outputting the received digital photographic image data without reducing the digital photographic image data;

extracting means, for extracting the high frequency components by employing the reduced digital photographic image or the non-reduced digital photographic image; and outputting means, for outputting a corrected digital photographic image based on the extracted high frequency components.

6. An image processing apparatus as defined in claim 5, further comprising:

correcting means, for administering blur correction on the digital photographic image, employing the high frequency components extracted by the extracting means.

7. An image processing apparatus as defined in claim 5, further comprising:

correcting means, for administering blur correction on the reduced image, employing the high frequency components extracted by the extracting means.

8. A computer readable medium storing a program that causes a computer to execute an image processing method for extracting high frequency components from a digital photographic image, the program comprising the steps of:

obtaining a blur width of a blur within a digital photographic image;

obtaining a reduced image, by reducing the resolution of the digital photographic image to a reduced digital photographic image when the blur width is greater than or equal to a predetermined threshold value;

maintaining a size of the digital photographic image by not reducing the digital photographic image if the blur width is less than a predetermined threshold value;

extracting the high frequency components by employing the reduced image or the non-reduced digital photographic image; and outputting a corrected digital photographic image based on the extracted high frequency components.

9. A computer readable medium storing a program that causes a computer to execute an image processing method for extracting high frequency components from a digital photographic image, the program comprising the steps of:

obtaining a blur width of a blur within a digital photographic image;

obtaining a reduced image, by reducing the resolution of the digital photographic image to a reduced digital photographic image when the blur width is greater than or equal to a predetermined threshold value;

maintaining a size of the digital photographic image by not reducing the digital photographic image if the blur width is less than a predetermined threshold value;

extracting the high frequency components by employing the reduced image or the non-reduced digital photographic image;

administering blur correction on the digital photographic image, employing the extracted high frequency component; and outputting the blur corrected digital photographic image.

10. A computer readable medium storing a program that causes a computer to execute an image processing method for extracting high frequency components from a digital photographic image, the program comprising the steps of:

obtaining a blur width of a blur within a digital photographic image;

obtaining a reduced image, by reducing the resolution of the digital photographic image to a reduced digital photographic image when the blur width is greater than or equal to a predetermined threshold value;

maintaining a size of the digital photographic image by not reducing the digital photographic image if the blur width is less than a predetermined threshold value;

extracting the high frequency components by employing the reduced image or the non-reduced digital photographic image; and administering blur correction on the reduced image, employing the extracted high frequency component; and outputting the blur corrected reduced image.

* * * * *